United States Patent
Kulkarni

(10) Patent No.: US 9,102,267 B2
(45) Date of Patent: *Aug. 11, 2015

(54) TRAILER SIGNAL CONVERTER

(75) Inventor: Chandrakumar Kulkarni, Battle Creek, MI (US)

(73) Assignee: Cequent Performance Products, Inc., Plymouth, MI (US)

( * ) Notice: Subject to any disclaimer, the term of this patent is extended or adjusted under 35 U.S.C. 154(b) by 398 days.

This patent is subject to a terminal disclaimer.

(21) Appl. No.: 13/470,924

(22) Filed: May 14, 2012

(65) Prior Publication Data

US 2012/0280807 A1    Nov. 8, 2012

Related U.S. Application Data

(63) Continuation-in-part of application No. 12/381,340, filed on Mar. 11, 2009, now Pat. No. 8,179,142.

(60) Provisional application No. 61/068,992, filed on Mar. 11, 2008.

(51) Int. Cl.
*B60Q 1/32* (2006.01)
*B60Q 1/30* (2006.01)
*H05B 33/08* (2006.01)

(52) U.S. Cl.
CPC .......... *B60Q 1/305* (2013.01); *H05B 33/0845* (2013.01)

(58) Field of Classification Search
CPC ........................................................ B60Q 1/32
USPC ...................................... 324/504, 503; 701/1
See application file for complete search history.

(56) References Cited

U.S. PATENT DOCUMENTS

| | | | |
|---|---|---|---|
| 3,883,845 A | 5/1975 | DeVita |
| 3,896,415 A | 7/1975 | Carter, III |
| 3,970,860 A | 7/1976 | Purdy |
| 4,005,313 A | 1/1977 | Tibbits |
| 4,064,413 A | 12/1977 | Andersen |
| 4,398,252 A | 8/1983 | Frait |
| 4,751,431 A | 6/1988 | Ducote |
| 4,845,465 A | 7/1989 | Kruse et al. |
| 4,866,390 A | 9/1989 | Butchko |
| 4,939,503 A | 7/1990 | Swanson |
| 5,030,938 A | 7/1991 | Bondzeit |
| 5,212,469 A | 5/1993 | Avellino |
| 5,241,241 A | 8/1993 | Eccleston |
| 5,285,113 A | 2/1994 | Schlich |
| 5,397,924 A | 3/1995 | Gee et al. |
| 5,498,910 A | 3/1996 | Hopkins et al. |
| 5,498,929 A | 3/1996 | Formwalt, Jr. |
| 5,521,466 A | 5/1996 | Vincent |

(Continued)

*Primary Examiner* — Vincent Q Nguyen
(74) *Attorney, Agent, or Firm* — McDonald Hopkins LLC

(57) ABSTRACT

A signal converter and method of converting a signal are provided. The converter includes a power supply, microcontroller and current sensor. The microcontroller is connected to a power supply and is configured to receive inputs from a vehicle and output signals to loads of a second vehicle. The sensor is connected to the microcontroller to monitor current flow at the loads. The output channels are configured to stagger activity on the output signals. The microcontroller reduces the duty cycle of the output signals if the current flow rises above a first threshold and resumes the output signal to full strength once the current flow falls bellow a second threshold. The method includes receiving an input signal, sending an output signal, measuring current flow, measuring temperature, reducing the power of the output signal, and restoring the output signal.

18 Claims, 1 Drawing Sheet

(56) References Cited

U.S. PATENT DOCUMENTS

| | | |
|---|---|---|
| 5,615,930 A | 4/1997 | McGrath et al. |
| 5,693,985 A | 12/1997 | Gee et al. |
| 5,701,116 A | 12/1997 | Hoekstra |
| 5,729,058 A | 3/1998 | Groeller |
| 5,760,545 A | 6/1998 | Mikel |
| 5,767,589 A | 6/1998 | Lake et al. |
| 6,087,777 A | 7/2000 | Long |
| 6,130,487 A | 10/2000 | Bertalan et al. |
| 6,177,865 B1 | 1/2001 | Bryant et al. |
| 6,232,722 B1 | 5/2001 | Bryant et al. |
| 6,420,832 B2 | 7/2002 | Rabine |
| 6,545,600 B1 | 4/2003 | Boner |
| 7,064,658 B2 | 6/2006 | Burlak et al. |
| 7,268,693 B2 | 9/2007 | Bell et al. |
| 8,179,142 B2 | 5/2012 | Kulkarni et al. |
| 2002/0082750 A1* | 6/2002 | Lamke et al. ............. 701/1 |
| 2002/0123837 A1 | 9/2002 | Eccleston et al. |
| 2005/0127747 A1 | 6/2005 | Robertson |
| 2006/0176166 A1* | 8/2006 | Smith et al. ............. 340/479 |
| 2008/0203975 A1 | 8/2008 | Burlak et al. |
| 2010/0152989 A1* | 6/2010 | Smith et al. ............. 701/78 |

\* cited by examiner

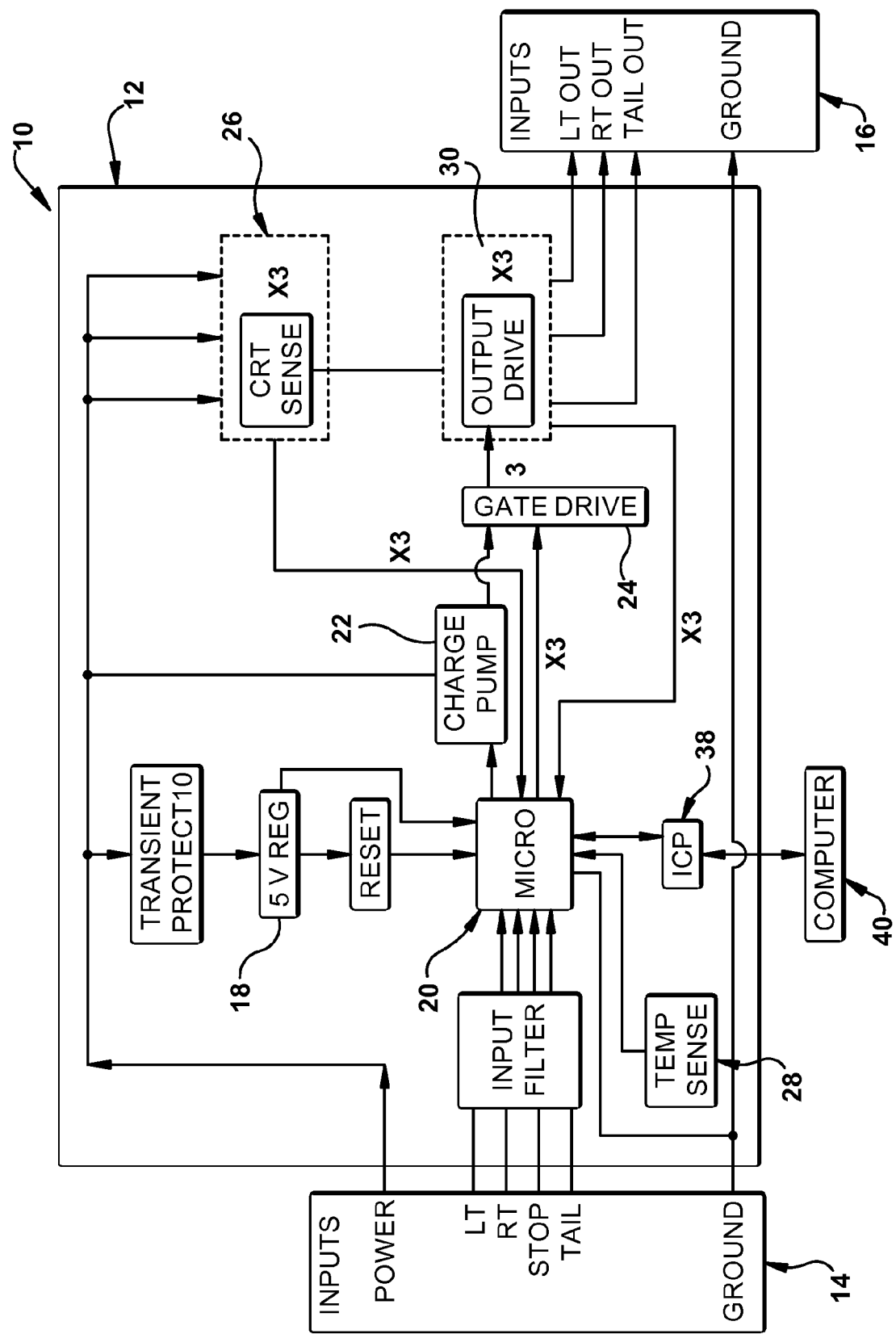

TRAILER SIGNAL CONVERTER

CROSS-REFERENCE TO RELATED APPLICATIONS

This application is a continuation-in-part of U.S. patent application Ser. No. 12/381,340, entitled "Trailer Signal Converter," filed on Mar. 11, 2009, which claims benefit from U.S. Provisional Patent Application No. 61/068,992, entitled "Trailer Signal Converter," filed on Mar. 11, 2008, each of which are hereby incorporated in their entirety by reference.

FIELD OF THE INVENTION

The present invention relates to a device for transmitting and converting signals, and more specifically to a device for transmitting and converting signals from a towing vehicle to a towed vehicle.

BACKGROUND OF THE INVENTION

Towed vehicles, such as trailers, have brake signals that operate based on the braking signals of the towing vehicle. As is well known in the art, the braking signals of the towing vehicle are electrically connected to the braking system of the towed vehicle, such as via an electrical adapter, or the like. Typically, the signaling system of the towing vehicle has a signal lamp and a brake lamp that are operated by at least two separate filaments. However, most trailer signal systems usually combine the turn and brake signals into a single lamp with a single filament. Accordingly, an adapter or circuitry is required in order to interface the signal system of the towing vehicle with the signal system of the towed vehicle or trailer.

Adapters that interface the signaling system of the towing vehicle and their respective towed vehicle or trailer are well known. Most adapters use the power from the signal system of the towing vehicle to power the signaling system of the towed vehicle. In order to accomplish this, the adapter must increase the amount of current from the towing vehicle signaling system to the towed vehicle signaling system. However, there are many disadvantages to such adapters.

One such disadvantage of known converters is that they do not have adequate safety and back-up features. For example, traditional converters typically do not have adequate overload and short circuit protection. As a result, traditional converters present a risk due to overheating should the load on the output exceed the rated load. Frequently, towed vehicles or trailers may have marking lights added to the taillights, for example, that may further increase the load on the output of the tail channel of the signaling system and, thus, the probability of exceeding the rated load of the output is quite possible. Traditional converters that have a means to detect short circuits may not have an automatic reset function wherein upon removal of the short circuit the converter starts normal operation.

Moreover, known adapters or converters fail to adequately protect the adapter if the load at the output exceeds the ratings of the converter. The failed attempts of known converters involve implementing thermal protection on the output driver. However, the thermal protection of the converter is a remedial measure. Thermal protection does not prevent the potential or eventual problem that causes overheating. Additionally, these known converters fail to detect short circuits and, as a result, can be damaged due to short circuit conditions.

Devices have also been developed that illuminate the signaling system of the towed vehicle with power signals separate from the towing vehicle signaling system. For example, solid state switching devices, such as transistors, relay coils, or other types of signal detection devices, may be used. However, these devices also have many disadvantages. For example, these devices can be damaged due to high power dissipation such as caused by high currents during overload or short circuit.

The towing vehicles may use a single bulb to indicate STOPLIGHT and TAILLIGHT functions. This is done by driving the light continuously for STOPLIGHT and for a partial time for TAILLIGHT. When a towed vehicle with known converters is connected to such towing vehicles, the TAILLIGHT may not function properly, may be very dim or flash.

Thus, the known converters are not capable of driving the lighting system of a towed vehicle to indicate a combined STOPLIGHT and TAILLIGHT bulb or light system. In addition, the prior art utilizes "smart drivers" that integrate all functions of a charge pump, current sense, temperature sense, or combinations thereof onto a single die. That makes the cost of these "smart drivers" very expensive. Not to mention that the consumer must take these drivers with all of the manufacturers specifications without a choice or any options. If the functions were separated, they could be tailored or fine tuned by the consumer for the specific application they were purchased for.

Therefore, there is a need in the art for an improved trailer signal converter or adapter. The present invention seeks to overcome many of the shortcomings of known adapters and circuitry for connecting the signaling system of the towing vehicle with the signaling system of the towed vehicle.

DESCRIPTION OF THE DRAWING

Objects and advantages together with the operation of the invention may be better understood by reference to the following detailed description taken in connection with the following illustration, wherein:

FIG. 1 illustrates a block diagram of an apparatus and system for connecting the signaling system of a towing vehicle to the signaling system of a towed vehicle in an embodiment of the present invention.

SUMMARY OF THE INVENTION

A signal converter that may include a power supply, a microcontroller and a current sensing device. The microcontroller may be connected to the power supply, and may be configured to receive a plurality of inputs from a first vehicle, and output a plurality of output signals to one or more loads of a second vehicle. The current sensing device may be connected to the microcontroller to monitor current flow at the loads. In addition, the microcontroller may be capable of reducing the duty cycle of the output signal in response to the current flow rising above a first predetermined threshold, and resuming the output signal to full strength once the current flow falls bellow a second predetermined threshold.

A signal converter that may include a power supply, a microcontroller and a current sensing device. The microcontroller may be connected to the power supply. The microcontroller may also include a plurality of input channels to receive input signals from a first vehicle and a plurality of output channels to send output signals to one or more output devices of a second vehicle. The current sensing device may be connected to the microcontroller to monitor the current drawn by the output devices. The output channels may be configured to stagger activity on the output signals. In addition, the microcontroller may be capable of limiting the power of the output signals in response to the current draw rising above a first predetermined threshold, and resuming the output signal to full strength once the current draw falls bellow a second predetermined threshold.

A method of converting a signal that may include receiving an input signal, sending an output signal, measuring current flow, measuring temperature, reducing the power of the output signal, and restoring the output signal. The output signal may be received from a first vehicle at an input channel of a microcontroller on a signal converting device. The output signal may be sent to an output device of a second vehicle from an output channel of the microcontroller in response to said input signal. The current flow may be measured at the load while the output signal is being sent to determine the presence of a circuit fault. The temperature of the signal converting device may be measured. The power of the output signal may be reduced in response to a circuit fault or in response to the temperature rising above a first predetermined threshold. The output signal may be restored to full strength once the circuit fault is removed and the temperature is below a second predetermined threshold.

DETAILED DESCRIPTION

While the invention is described herein with reference to several embodiments, it should be clear that the invention should not be limited only to the embodiments disclosed or discussed. The description of the embodiments herein is illustrative of the invention and should not limit the scope of the invention as described or claimed.

With reference to FIG. 1, an embodiment of an adapter or trailer signal converter 10 is provided. The adapter 10 may be used to transmit signals and/or convert signals from a signaling system of a towing vehicle to a signaling system of a towed vehicle or trailer. The towing vehicle may be, for example, an automobile, a truck, a tractor or any other appropriate type of towing vehicle having a signaling system. The towed vehicle may be a cargo trailer, a livestock trailer, a vehicle trailer or any other appropriate type trailer or vehicle capable of being towed that has a signaling system, such as a brake and/or turn signal.

Unlike the prior art, the adapter or trailer signal converter 10 may detect the presence of overload and short circuit and takes action to protect the converter 10 from overheating. The adapter 10 may do so by reducing the duty cycle of the output drive. In addition, should the fault in the output be removed, the converter 10 may automatically detect that without resetting it and start driving the output loads normally again. In addition, the trailer signal converter 10 may also separate the control of various functions, such as a current sense, charge pump, power drive with low heat dissipation and temperature sensing, and the like, for example, so that the consumer may tailor them to their own specifications or fine tune the functions for a specific application.

The trailer signal converter or adapter 10 may include a circuit board 12 having an input 14 and an output 16. As illustrated in FIG. 1, the adapter 10 may have the input 14 on one side of the circuit board 12 and the output 16 on the opposing side of the circuit board 12. It is to be understood, however, that the input 14 and the output 16 may be positioned at any appropriate location on the circuit board, such as on the same side of the circuit board 12. The input and the output 16 may also be implemented by using one or more connectors (not shown).

The circuit board 12 may be assembled into a box (not shown) and potted using any appropriate type of material. Preferably, the circuit board 12 may be potted using a material that is suitable to protect the components from thermal cycling. In addition, the circuit board 12 may be overmolded as an alternative. In use, the box may be mounted or otherwise positioned in the interior or on the exterior of a towing vehicle.

A power supply 18 may be incorporated into the circuit board 12. The power supply 18 may be of any appropriate type, but the power supply 18 may preferably be derived from the power supply of the towing vehicle. The power supply 18 may power a microcontroller 20 and the associated circuits of the trailer signal converter or adapter 10, as shown in FIG. 1. The power supply of the towing vehicle may also provide power to the adapter 10 and may work in combination with the power supply 18 to power the adapter 10.

The microcontroller 20 may store data, such as a program, or the like, in memory, such as, flash memory, for example. The data may be software that may be utilized to control the operation of the trailer signal converter or adapter 10. The input 14 may be in communication with the microcontroller 20. For example, the microcontroller 20 may analyze signals from the input 14. The signals at the input 14 may be defined by channels, such as a left turn channel, a right turn channel, a stop light channel, a tail channel, a backup channel, and the like.

The output channels 16 may be activated or turned on at staggering intervals or times in order to reliably detect problematic conditions that may exist at the output 16 of the adapter or trailer signal converter 10, such as an over load or a short circuit. In an embodiment, the microcontroller 20 may implement "exclusive OR" logic with STOPLIGHT and TURN channels to transmit or convert the signal to the output 16. Alternately, the output TURN signals in 16 may be in synchronization with the input TURN signals in 14.

One of ordinary skill in the art will appreciate that other appropriate logic may be used to transmit or convert signals from the towing vehicle to the towed vehicle. Advantageously, the microcontroller 20 may also determine a short circuit or excessive load on the output 16 by reading the outputs of a current sense 26, as shown in FIG. 1. Any appropriate device, such as a sampling resistor or a printed circuit trace, may be used as the current sense 26.

For example, the microcontroller 20 may determine the amount of current in the load to determine the presence of an overload or a short circuit at the output 16. More specifically, the microcontroller 20 may compare the amount of current at the output 16, at a specific time after turning the corresponding output 16 ON, to a known current or a predetermined current at the output 16 to determine the presence of an excessive load or short circuit.

Based on the amount of current, the microcontroller 20 may control various components of the microcontroller 20. As an example, the microcontroller 20 may turn the output 30 off. The microcontroller 20 may then retry again after a predetermined time interval, for example, two (2) seconds, or the like. The microcontroller 20 may then resume normal operation if the microcontroller 20 does not detect an overload or short circuit after the retry.

In conserving power or otherwise controlling the trailer signal converter or adapter 10, the microcontroller 20 may monitor the voltage or the current from the power source of the signaling system. With further reference to FIG. 1, a current sensor 26 may be in communication with the microcontroller 20. The current sensor 26 may monitor the current transmitted to the output 16. The current sensor 26 may comprise, for example, a sampling resistor or a printed circuit trace. The current sensor 26 may also monitor the current prior to turning the channel on and after turning the channel on. Accordingly, the current sensor 26 may monitor the current to detect open, overload or short circuit conditions.

For example, some signaling systems of towing vehicles have some voltage present on the stoplight channel input even when the stop light channel input is not active. The stoplight channel and tail channel may use analog inputs. The threshold at which the analog inputs of these channels is recognized as active may be programmed into the microcontroller 20. Thus, in an embodiment, the stoplight input may only be recognized as active when the voltage exceeds a predetermined threshold. By determining the analog voltage level of the tail channel at the input 14, issues or problems with voltage drop along the input 14 may be identified and remedied.

The microcontroller 20 may further include memory. The memory may be of any appropriate type, such as Electrically Erasable Programmable Read-Only Memory (EEPROM). EEPROM is a type of non-volatile memory that may be used in computers and other electronic devices to store small amounts of data that must be saved when power is removed, e.g., calibration tables or device configuration. The EEPROM may be used for calibration of the current on each channel of the input 14 and/or the output 16. Since the current sensor 26 detects current, the current sensor can be calibrated and the calibration factor may be stored on the memory of the microcontroller 20. The memory of the microcontroller 20 may store software or other logic to operate the trailer signal converter or adapter 10.

In an embodiment, temperature sensor 28 may provide temperature sensing by, for example, use of a thermistor, such as a Negative Temperature Coefficient (NTC) thermistor. In a NTC thermistor, the resistance may decrease with increasing temperature. The temperature sensing 28 may be a separate component(s) to the microcontroller 20 and may be located at a different and even multiple locations on the adapter 10. For example, the temperature sensor 28 may be located adjacent to the tail output drive of 30.

The temperature may be used by the microcontroller 20 in determining whether to turn the power off at the output 16, whether to limit the power at the output 16, such as by pulse-width modulation (PWM) or any other appropriate method known to one or ordinary skill in the art, or whether to take some sort of other action. The channels at the output 16 may reactivated or otherwise be turned back on when the temperature returns to a safe value or drops below a predetermined value. The current and voltage may be sensed at a predetermined time after first transmitting the power to the output 16. The temperature may be sensed periodically.

In some towing vehicles, for example, PWM may be used on the tail channel so that the same light can be used on the stoplight channel and the tail channel. The stoplight may turn ON with continuous voltage, whereas the tail may be turned ON using PWM to reduce the intensity of the light. Also, some towing vehicles use pseudo-multiplex signals that require decoding or conversion back to conventional signals to drive the towed vehicle signaling system.

In an embodiment, the microcontroller 20 may detect the PMW/pseudo-multiplex scheme on the channels of the input 14 and drives of the outputs 16 for the signaling system of the towed vehicle. The towed vehicle may use same light for turn and tail channels. With reference to FIG. 1, the microcontroller 20 may be programmed to send signals, such as PWM/pseudo-multiplex signals to the gate drive 24.

The microcontroller 20 may be programmed to detect various PWM/pseudo-multiplex schemes that may be used by the towing vehicle. For example, the microcontroller 20 may receive a single PWM/pseudo-multiplex signal that contains information related to the stop light signal, tail light signal, and left turn light signal on the left turn input line and information related to the stop light signal, tail light signal, and right turn signal on right turn input line. The microcontroller 20 may be programmed to automatically detect the presence of this PWM/pseudo-multiplex signal scheme and decode the stop light signal, tail light signal, and left and right turn light signals to be sent to the towed vehicle.

The microcontroller 20 may further be configured to receive and automatically detect a PWM/pseudo-multiplex signal scheme on only the stop light input. For example, the left and right turn signals may be separate and discrete signals configured as standard high/low voltage inputs, while the stop light and tail light signals may be provided on a single input. In an embodiment, the stop signal may be a standard high-low voltage signal while tail light signal is a PWM/pseudo-multiplex signal on the stop light signal input line. It will be appreciated that the stop light signal and tail light signal may also both be PWM/pseudo-multiplex signals. The microcontroller 20 may be programmed to automatically detect the presence of this signal scheme and decode the tail light and stop light signals appropriately to be sent to the towed vehicle.

Depending on the signal transmitted by the input 14, the microcontroller 20 may activate or "turn on" a charge pump 22 to transmit signals to the output 16. In addition, the charge pump 22 may drive a gate drive 24, as illustrated in FIG. 1. In a preferred embodiment, the output drive 26 may be a N-channel Metal-Oxide-Semiconductor Field-Effect Transistor (MOSFET). A MOSFET is a device that may be used to amplify or switch electronic signals. The MOSFET may be composed of a channel of either N-type (N for negative) or P-type (P for positive) semiconductor material. A P-channel MOSFET may be used without a charge pump. The gate drive 24 may also control or switch the power to the output 16. The gate drive 24 may be composed of switching transistors semiconductor. One of ordinary skill in the art will appreciate that any other appropriate schemes and devices may be used in place of the gate drive 24 and charge pump 22. Keeping the MOSFET, current sense 26, and charge pump 22 separate may give an optimum performance in terms of power dissipation and detecting overload and short circuit on the output channel(s). Alternatively, the MOSFET may be a smart power MOSFET. The smart power MOSFET may include an integrated charge pump 22 and current sense 26, thus decreasing the number of components of the adapter 10. The outputs of the current sense can be used to detect faults such as overload and short circuit.

The output drive 30 may preferably have a low on resistance (RDSon) to dissipate power. As a result, heat generation may be maintained at a relatively low level. In an embodiment, the charge pump 22 may drive the gate drive 24 of the N-channel MOSFETs, such as in high-side driving, for example.

With reference to FIG. 1, the microcontroller 20 may be used to control the use of the charge pump 22 to conserve power when the trailer signal convert or adapter 10 does not require use of the charge pump 22. To keep the quiescent current low, such as less than 1 mA, the charge pump 22 may be turned on only when necessary. In an embodiment where the current sensor 26, the gate drive 24 and the charge pump 22 are separate components, the adapter 10 may maximize the performance related to power dissipation and detection of overload and short circuits on the output 16. In addition, the use of separate components may allow for tailoring and fine tuning of the adapter 10 to a specific use.

The gate drive 24 and the current sensor 26 may also be in communication with an output drive 30. The output drive 30 may be in communication with the output 16 in order to transmit the signals to the towed vehicle. The adapter 10 may have a circuit programming adapter 38 for communicating with the computer 40 to program the memory in microcontroller 20.

The adapter 10 may reduce its power consumption by entering into sleep mode after the inputs have been inactive for a predetermined period of time. While in sleep mode, the adapter 10 may reduce its power consumption by powering down some components of the adapter 10. The adapter 10 may wakeup from sleep mode once any activity is sensed on any input line. Alternatively, the adapter 10 may go to sleep and periodically wake up and poll each input line to determine if any inputs are active and wakeup the adapter from sleep mode once an active input is detected.

The embodiments of the invention have been described above and, obviously, modifications and alternations will occur to others upon reading and understanding this specification. The claims as follows are intended to include all modifications and alterations insofar as they come within the scope of the claims or the equivalent thereof.

Having thus described the invention, the following is claimed:

1. A signal converter comprising:
a microcontroller configured to receive one or more input signals from a first vehicle and output a plurality of output signals to a second vehicle;
wherein said microcontroller is capable of decoding a single input signal containing information related to two or more lights of said first vehicle and outputting a separate output signal for each light to said second vehicle, wherein the single input signal includes a pulse-width modulated signal.

2. The signal converter of claim 1, wherein the one or more input signals include at least one of: a stop signal, a tail light signal, a left turn signal, and a right turn signal.

3. The signal converter of claim 1, wherein the first vehicle is a towing vehicle and the second vehicle is towed by the towing vehicle.

4. The signal converter of claim 2, wherein the single input includes information related to the stop light and tail light of the first vehicle.

5. The signal converter of claim 4, wherein the tail light information is contained in a pulse-width modulated signal.

6. The signal converter of claim 4, wherein the single input further includes information related to a right turn light of the first vehicle.

7. The signal converter of claim 4, wherein the single input further includes information related to a left turn light of the first vehicle.

8. The signal converter of claim 6, wherein the tail light, stop light, and right turn light information is contained in a pulse-width modulated signal.

9. A signal converter comprising:
a microcontroller configured to receive one or more input signals from a first vehicle and output a plurality of output signals to a second vehicle; and
wherein said microcontroller identifies a pulse-width modulated signal at the one or more input signals and determining what information related to the first vehicle is present in the pulse-width modulated signal.

10. The signal converter of claim 9, wherein said input signals include information related to light signals of the first vehicle.

11. The signal converter of claim 9, wherein the pulse-width modulated signal includes information related to the stop light and tail light of the first vehicle.

12. The signal converter of claim 9, wherein the pulse-width modulated signal includes information related to the stop light, tail light, and left and right turn signals of the first vehicle.

13. The signal converter of claim 9 further comprising a MOSFET.

14. The signal converter of claim 13 further comprising a current sense and a charge pump.

15. The signal converter of claim 14, wherein the charge pump and current sense are integrated with the MOSFET.

16. A signal converter comprising:
a microcontroller configured to receive one or more input signals related to lights of a first vehicle and output a plurality of output signals to a second vehicle;
wherein said microcontroller is capable of decoding a single input signal containing information related to two or more lights of said first vehicle and outputting a separate output signal for each light to said second vehicle, wherein the single input signal includes a pulse-width modulated signal;
wherein the signal converter is configured to enter a sleep mode after the one or more input signals are non-active for a predetermined period of time;
wherein said signal converter reduces power consumption while in sleep mode.

17. The signal converter of claim 16, wherein the signal converter is configured to exit said sleep mode upon detecting activity on one of said one or more input signals.

18. The signal converter of claim 17, wherein the signal converter is configured to poll each input signal at a set rate to determine activity on the one or more input signals.

* * * * *